(12) United States Patent
Feuerstein et al.

(10) Patent No.: US 11,988,552 B2
(45) Date of Patent: May 21, 2024

(54) PHOTOCONDUCTOR READOUT DEVICE AND METHOD OF USING SAME FOR DETERMINING RESPONSIVITY AND DETECTIVITY

(71) Applicant: TRINAMIX GMBH, Ludwigshafen am Rhein (DE)

(72) Inventors: Bertram Feuerstein, Ludwigshafen (DE); Sebastian Valouch, Ludwigshafen (DE); Robert Gust, Ludwigshafen (DE); Stefan Klueh, Ludwigshafen (DE); Robert Send, Karlsruhe (DE); Darren Richard Gould, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 17/765,949

(22) PCT Filed: Oct. 8, 2020

(86) PCT No.: PCT/EP2020/078208
§ 371 (c)(1),
(2) Date: Apr. 1, 2022

(87) PCT Pub. No.: WO2021/069544
PCT Pub. Date: Apr. 15, 2021

(65) Prior Publication Data
US 2022/0333981 A1   Oct. 20, 2022

(30) Foreign Application Priority Data

Oct. 9, 2019 (EP) ..................... 19202140

(51) Int. Cl.
*G01J 1/42* (2006.01)
*G01J 1/44* (2006.01)
(Continued)

(52) U.S. Cl.
CPC ............... *G01J 1/4228* (2013.01); *G01J 1/46* (2013.01); *G01J 3/2803* (2013.01); *G01J 5/22* (2013.01); *G01J 2001/4446* (2013.01)

(58) Field of Classification Search
CPC .......... G01J 1/4288; G01J 1/46; G01J 3/2803; G01J 5/22; G01J 2001/4446; G01J 1/0252;
(Continued)

(56) References Cited

U.S. PATENT DOCUMENTS 4,551,623 A * 11/1985 Elliott .................. H04N 25/701
257/E31.093
5,185,519 A    2/1993 Hayes, Jr.
(Continued)

FOREIGN PATENT DOCUMENTS

WO    2016120392 A1    8/2016

OTHER PUBLICATIONS

International Search Report and Written Opinion for corresponding PCT/EP2020/078208 dated Dec. 23, 2020; 10 pages.

*Primary Examiner* — Jennifer D Bennett
(74) *Attorney, Agent, or Firm* — Armstrong Teasdale LLP (57) ABSTRACT

A device includes at least one array of photoconductors, at least one bias voltage source, and at least one photoconductor readout circuit. Each photoconductor is configured for exhibiting an electrical resistance dependent on an illumination of its light-sensitive region, and at least one photoconductor of the array is designed as characterizing photoconductor. The bias voltage source is configured for applying at least one alternating bias voltage to the characterizing photoconductor or at least one direct current (DC) bias voltage to the characterizing photoconductor. The photoconductor readout circuit is configured for determining of a response voltage of the characterizing photoconductor (Continued)

generated in response to the bias voltage. The response voltage is proportional to a variable characterizing the array of photoconductors. The photoconductor readout circuit configured for determining of the response voltage of the characterizing photoconductor during operation of the array of photoconductors.

13 Claims, 1 Drawing Sheet

(51) Int. Cl.
*G01J 1/46* (2006.01)
*G01J 3/28* (2006.01)
*G01J 5/22* (2006.01)

(58) Field of Classification Search
CPC ......... G01J 2001/444; G01J 2001/4453; G01J 2001/448
See application file for complete search history.

(56) References Cited

U.S. PATENT DOCUMENTS 6,064,066 A * 5/2000 Bevan ................. G01J 5/20
250/252.1
2017/0336271 A1* 11/2017 Contreras ............. G01K 7/16

* cited by examiner

PHOTOCONDUCTOR READOUT DEVICE AND METHOD OF USING SAME FOR DETERMINING RESPONSIVITY AND DETECTIVITY

CROSS-REFERENCE TO RELATED APPLICATIONS

This application is a U.S. National Phase Application of International Patent Application No. PCT/EP2020/078208, filed Oct. 8, 2020, which claims priority to European Patent Application No. 19202140.0, filed Oct. 9, 2019, each of which is hereby incorporated by reference herein.

FIELD OF THE INVENTION

The invention relates to a device, methods and use of a device for readout of photoconductors. Specifically, the device may be used for calibration of photoconductors such as of lead sulfide photoconductors sensors.

Prior Art

Spectrometers require sensors to detect electromagnetic absorption at different wavelengths in the electromagnetic spectrum. One approach is to use an array of sensors where each pixel in the array responds to electromagnetic energy of a different wavelength. Each sensor in the array would need to filter incoming radiation in order to respond to a different wavelength.

One class of sensor is the photoconductor where the electrical resistance of the device is dependent upon the incident electromagnetic energy. Three characteristics of the photoconductor are important to determine its behavior; the dark resistance, responsivity and detectivity. The dark resistance, responsivity and detectivity are a function of the photoconductor dimensions and material properties along with temperature, humidity, contaminants and other factors.

Due to the dependence of these parameters on environmental factors, regular calibration is required. Calibration routines are generally performed at regular intervals. These routines are time consuming and changes to the sensor characteristics after calibration will lead to measurement errors.

Thus, there is a need for reliable, fast and less complex methods and devices for characterizing photoconductor sensor arrays.

U.S. Pat. No. 5,185,519 A describes a lead salt detector array where the output voltage of each detector is switched between a signal ground or an amplifier input virtual ground. A switching circuit communicates with each detector. The detectors from which it is desired to read a signal is switched to the amplifier input virtual ground.

Problem Addressed by the Invention

Therefore, a problem addressed by the present invention is that of specifying a device and methods which at least substantially avoid the disadvantages of known circuits of this type. In particular, an improved calibration, in particular in real-during operation of the photoconductor array, would be desirable.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a device is disclosed. The device comprises:

- at least one array of photoconductors, wherein each photoconductor is configured for exhibiting an electrical resistance dependent on an illumination of its light-sensitive region, wherein at least one photoconductor of the array is designed as characterizing photoconductor;
- at least one bias voltage source, wherein the bias voltage source is configured for applying at least one alternating bias voltage to the characterizing photoconductor or at least one direct current (DC) bias voltage to the characterizing photoconductor;
- at least one photoconductor readout circuit, wherein the photoconductor readout circuit is configured for determining of a response voltage of the characterizing photoconductor generated in response to the bias voltage, wherein the voltage response is proportional to a variable characterizing the array of photoconductors, wherein the photoconductor readout circuit is configured for determining of the response voltage of the characterizing photoconductor during operation of the array of photoconductors.

The term "photoconductor", also denoted as photoresistor, as used herein is a broad term and is to be given its ordinary and customary meaning to a person of ordinary skill in the art and is not to be limited to a special or customized meaning. The term specifically may refer, without limitation, to a light sensitive element capable of exhibiting a specific electrical resistance $R_{photo}$ dependent on an illumination of the light-sensitive region the photoconductor. Specifically, the electrical resistance is dependent on the illumination of a material of the photoconductor. As will be outlined in detail below, the photoconductor may comprise a light-sensitive region comprising a "photoconductive material". A photoconductor can, for example, be applied in light-sensitive detector circuits.

The term "array" of photoconductors as used herein is a broad term and is to be given its ordinary and customary meaning to a person of ordinary skill in the art and is not to be limited to a special or customized meaning. The term specifically may refer, without limitation, to a plurality of photoconductors arranged in a matrix having a plurality of pixels. As further used herein, the term "matrix" generally refers to an arrangement of a plurality of elements in a predetermined geometrical order. The matrix specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The photoconductors of the matrix specifically may be equal in one or more of size, sensitivity and other optical, electrical and mechanical properties. The light-sensitive regions of all o photoconductors of the matrix specifically may be located in a common plane, such that a light beam illuminating the array may generate a light spot on the common plane. The array may be fabricated monolithically on the same substrate. The photoconductors of the array may be designed identical, in particular with respect to size and/or shape of their light-sensitive regions and/or photoconductive materials.

The term "illumination" as used herein is a broad term and is to be given its ordinary and customary meaning to a person of ordinary skill in the art and is not to be limited to a special or customized meaning. The term specifically may refer, without limitation, to electromagnetic radiation in one or more of the visible spectral range, the ultraviolet spectral range and the infrared spectral range. Therein, in partial accordance with standard ISO-21348, the term visible spectral range generally refers to a spectral range of 380 nm to 760 nm. The term infrared (IR) spectral range generally refers to electromagnetic radiation in the range of 760 nm to 1000 µm, wherein the range of 760 nm to 1.4 µm is usually denominated as the near infrared (NIR) spectral range, and the range from 15 µm to 1000 µm as the far infrared (FIR) spectral range. The term "ultraviolet spectral range" generally refers to electromagnetic radiation in the range of 1 nm to 380 nm, preferably in the range of 100 nm to 380 nm. In the following, the term "illumination" is also denoted as "light". Preferably, illumination as used within the present invention is visible light, i.e. light in the visible spectral range, and/or infrared light, i.e. light in the infrared spectral range.

As used herein, the term "light-sensitive region of the photoconductor" generally refers to an area of the photoconductor being sensitive to an illumination, e.g. by an incident light beam. For example, the light-sensitive region may be a two-dimensional or three-dimensional region which preferably, but not necessarily, is continuous and can form a continuous region. The photoconductor can have one or else a plurality of such light-sensitive regions. As used herein, the term "to exhibit an electrical resistance dependent on an illumination" generally refers to that the electrical resistance of the photoconductor is adjusted and/or changed and/or varied dependent, on the illumination, in particular an intensity of the illumination, of the light-sensitive region. In particular, in response to the illumination, the electrical resistance is adjusted and/or changed and/or varied. When the photoconductor is illuminated the photoconductor may exhibit a decrease in electrical resistance. The photoconductor may lower its resistivity when illuminated. Specifically, the electrical resistance of the photoconductor may decrease with increasing incident light intensity. The change between dark resistance and bright resistance is the quantity to be measured or to be read out, and may be denoted as output current of the photoconductor. As used herein, the term "dark resistance" generally refers to an electrical resistance of the photoconductor in unlit state, i.e. without illumination. As further used herein, the term "bright resistance" refers to an electrical resistance of the photoconductor under illumination. For measuring and/or read out generally voltage divider circuits are known which have a non-linear behavior. The present invention, as will be outlined in more detail below, proposes circuit features having a linear behavior.

The photoconductor may comprise at least one photoconductive material. Since an electrical resistance is defined as the reciprocal value of the electrical conductivity, alternatively, the term "photoresistive material" may also be used to denominate the same kind of material. The light-sensitive region may comprise at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, e.g. doped Ge, Si, GaAs, organic semiconductors. However, other materials may be feasible. Further possible photoconductive materials are described in WO 2016/120392 A1, for example. For example, the photoconductor may be a photoconductor commercially available under the brand name Hertzstueck™ from trinamiX GmbH, D-67056 Ludwigshafen am Rhein, Germany.

For example, the light-sensitive region may be illuminated by at least one illumination source. The illumination source can for example be or comprise an ambient light source and/or may be or may comprise an artificial illumination source. By way of example, the illumination source may comprise at least one infrared emitter and/or at least one emitter for visible light and/or at least one emitter for ultraviolet light. By way of example, the illumination source may comprise at least one light emitting diode and/or at least one laser diode. The illumination source can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. The illumination source generally may be adapted to emit light in at least one of: the ultraviolet spectral range, the infrared spectral range. Most preferably, at least one illumination source is adapted to emit light in the NIR and IR range, preferably in the range of 800 nm and 5000 nm, most preferably in the range of 1000 nm and 4000 nm.

The illumination source may comprise at least one non-continuous light source. Alternatively, the illumination source may comprise at least one continuous light source. The light source may be an arbitrary light source having at least one radiating wavelength having an overlap to the sensitive wavelength of the photoconductor. For example, the light source may be configured for generating a Planckian radiation. For example, the light source may comprise at least one light emitting diode (LED) and/or at least one Laser source. For example, the light source may be configured for generating illumination by an exotherm reaction, like an oxidation of liquid or solid-material or Gas. For example, the light source may be configured for generating illumination out of fluorescent effects. The illumination source may be configured for generating at least one modulated light beam. Alternatively, the light beam generated by the illumination source may be non-modulated and/or may be modulated by further optical means. The illumination source may comprise at least one optical chopper device configured for modulating a light beam from the continuous light source. The optical chopper device may be configured for periodically interrupting the light beam from the continuous light source. For example, the optical chopper device may be or may comprise at least one variable frequency rotating disc chopper and/or at least one fixed frequency tuning fork chopper and/or at least one optical shutter. Due to the non-continuous illumination the output current may be a changing current signal, also denoted modulation current. The modulated current may be small comparted to dark current of the photoconductor.

The photoconductors of the array each may respond to electromagnetic energy of a different wavelength. In particular, the photoconductors may detect electromagnetic absorption at different wavelengths in the electromagnetic spectrum. The array of photoconductors may be designed such that each pixel in the array responds to electromagnetic energy of a different wavelength. For example, at least one filter arrangement may be used. However, other arrangements are possible. This may allow using the array for spectrometer applications.

The device comprises at least one bias voltage source configured for applying at least one bias voltage to the photoconductor. The photoconductors of the array may be electrically connected with the bias voltage source. As used herein, the term "bias voltage source" refers to at last one voltage source configured for generating the bias voltage. The bias voltage may be the voltage applied across the photoconductor material.

The bias voltage source is configured for applying at least one alternating bias voltage $U_{bias,AC}$ to the characterizing photoconductor. As used herein, the term "alternating bias voltage" refers to the fact that the bias voltage is a periodical time-dependent bias voltage and/or modulated bias voltage. The bias voltage source may be configured for changing the bias voltage. As used herein, the term "modulated" refers to a change of polarization of the bias voltage on the photoconductor in such a way that the net flow of the charge carriers through the photoconductor is over a measurement period zero. Specifically, the bias voltage is selected such that an integral of charge carriers, such as the total current which flows through the photoconductor over a measurement period is zero. The measurement period may be the time between two consecutive transitions of the bias voltage polarization in the same direction, such as from rising edge, e.g. a positive edge, to rising edge or from falling edge, e.g. negative edge, to falling edge. The bias voltage can be from ±0.001 V to ±5000 V. Preferably, the bias voltage may be from ±0.1 V to ±500 V and most preferably the bias voltage may be from ±1 V to ±50 V. The bias voltage may be switching between positive and negative. An electrical field across the photoconductive material due to the applied bias voltage may be about 50 V/mm.

The bias voltage source is configured for applying at least one direct current (DC) bias voltage $U_{bias,DC}$ to the characterizing photoconductor. The bias voltage may be a direct current (DC) voltage. The bias voltage $U_{bias,DC}$ is 0.001 V≥$U_{bias,DC}$≤5000 V, preferably 1 V≥$U_{bias,DC}$≤500 V, most preferably 5 V≥$U_{bias,DC}$≤50 V.

The bias voltage may be a modulated voltage. The voltage flowing through the photoconductors may be modulated or static. The bias voltage source may be part of an oscillating circuit such as an RC-controlled oscillator.

The term "photoconductor readout circuit" as used herein is a broad term and is to be given its ordinary and customary meaning to a person of ordinary skill in the art and is not to be limited to a special or customized meaning. The term specifically may refer, without limitation, to an electronic circuit configured for readout of at least one photoconductor and/or a plurality of photoconductors. The term "determining of the response signal", as used herein is a broad term and is to be given its ordinary and customary meaning to a person of ordinary skill in the art and is not to be limited to a special or customized meaning. The term specifically may refer, without limitation, to readout of the response signal. The term "readout", as used herein is a broad term and is to be given its ordinary and customary meaning to a person of ordinary skill in the art and is not to be limited to a special or customized meaning. The term specifically may refer, without limitation, to measuring and/or detecting of the response signal.

The term "characterizing" as used herein is a broad term and is to be given its ordinary and customary meaning to a person of ordinary skill in the art and is not to be limited to a special or customized meaning. The term specifically may refer, without limitation, to determining behavior of the array of photoconductors. The behavior of the array of photoconductors may depend on dark resistance and/or responsivity R and/or detectivity D*. The variable characterizing the array of photoconductors may be at least one variable selected from the group consisting of: dark resistance $R_{dark}$; signal noise N; signal response S to a known intensity. The responsivity of the photoconductor may be a measurement of a DC resistance of the photoconductor. It is a function of the DC bias voltage applied to the photoconductor and a DC current flowing through it. The responsivity of the photoconductor may be a measure of output voltage per unit Watt of the incident electromagnetic energy. The detectivity D* of the photoconductor may be a measure of signal to noise ratio of the photoconductor normalized to the frequency f of interest, incoming power density of the illumination source and the light-sensitive region of the photoconductor. The term "characterizing photoconductor" as used herein is a broad term and is to be given its ordinary and customary meaning to a person of ordinary skill in the art and is not to be limited to a special or customized meaning. The term specifically may refer, without limitation, to at least one photoconductor of the array used for characterizing the array of photoconductors. Monolithically integrated high-density arrays of photoconductors may be produced on a single insulated substrate. The dark resistance, resistivity and detectivity may be similar between the individual photoconductors and change with approximately the same proportional relative the each other when environmental conditions change.

The characterizing photoconductor may be covered with at least one opaque mask. The term "opaque mask" as used herein is a broad term and is to be given its ordinary and customary meaning to a person of ordinary skill in the art and is not to be limited to a special or customized meaning. The term specifically may refer, without limitation, to at least one blocking element and/or filter element configured to prevent passage of light. The opaque mask may be configured for preventing that light can pass to the light-sensitive region of the covered photoconductor. The characterizing photoconductor may be sensitive to a narrow wavelength range, in particular to a single wavelength. The opaque mask may be configured as filter element configured for preventing that light of said wavelength can pass to the characterizing photoconductor. Usage of the opaque mask may allow measurement of dark resistance.

The bias voltage source may be configured for apply the alternating bias voltage to the photoconductor covered with the opaque mask. The photoconductor readout circuit may be configured for determining the response voltage of the characterizing photoconductor generated in response to the alternating bias voltage. The voltage response may be proportional to the dark resistance $R_{dark}$ of the characterizing photoconductor. The terms response voltage and voltage response are used interchangeable herein.

For determining of the dark resistance, the photoconductor readout circuit may be designed as follows. The photoconductor readout circuit may comprise at least one voltage divider circuit. The voltage divider circuit may comprise at least one reference resistor $R_{ref}$ being arranged in series with the characterizing photoconductor. The term "voltage divider circuit", also denoted as potential divider, as used herein is a broad term and is to be given its ordinary and customary meaning to a person of ordinary skill in the art and is not to be limited to a special or customized meaning. The term specifically may refer, without limitation, to an electronic circuit which is configured for generating an output voltage signal which is a fraction of an input voltage signal of the voltage divider circuit. The term "reference resistor" as used herein is a broad term and is to be given its ordinary and customary meaning to a person of ordinary skill in the art and is not to be limited to a special or customized meaning. The term specifically may refer, without limitation, to a resistor having a known electrical resistance $R_{ref}$. The reference resistor may be an arbitrary resistor adapted to allow determining voltage changes. The photoconductor readout circuit may comprise at least one charge amplifier. A charge amplifier is one of many different possible readout integrated circuits (ROICs) which may be used. Transimpedance amplifiers, non-inverting amplifiers, direct injection circuit with skimming may be possible architectures to the ROIC, too. The term "charge amplifier" as used herein is a broad term and is to be given its ordinary and customary meaning to a person of ordinary skill in the art and is not to be limited to a special or customized meaning. The term specifically may refer, without limitation, to an electronic device configured as integrator with high input impedances. The charge amplifier may be configured to convert charge into voltage. The high input impedances may prevent leakage loss. The charge amplifier may comprise an operational amplifier. The charge amplifier may comprise at least one capacitor $C_F$ in a feedback path. The capacitor in the feedback path may be configured for accumulating current over time. The photoconductor readout circuit comprises at least one capacitor, denoted as capacitor $C_b$ in the following. The capacitor may have a capacity from 100 pF to 500 nF. The capacitor $C_b$ may be arranged between the input of the charge amplifier and an output of the voltage divider circuit. The term "capacitor" as used herein is a broad term and is to be given its ordinary and customary meaning to a person of ordinary skill in the art and is not to be limited to a special or customized meaning. The term specifically may refer, without limitation, to at least one element configured for collecting and/or storing electrical energy, in particular originating from an output of the voltage divider circuit. If the capacitor $C_b$ is sufficiently large, the dark resistance can be determined by $$|R_{dark}| = \left| \frac{v_b \tau}{\Delta v_o C_F} \right|,$$

wherein $v_b$ is the amplitude of the alternating bias voltage, $\Delta v_o$ is the response voltage and $\tau$ is the integration time of the charge amplifier. Other readout electronics or small capacitors $C_b$ that rely on the alternating bias voltage may have different relationships between the dark resistance and the response voltage but a closed linear solution will exist in these cases as well.

Alternatively, for determining of the dark resistance the photoconductor readout circuit may be designed as at least one current skimming circuit. Other architectures may be possible, too. For example, the dark resistance can be determined by measuring the current directly and by calculating the resistance through ohm's law.

The device may comprise at least one evaluation device. The evaluation device may be configured for determining dark resistance of each photoconductor of the array considering the dark resistance $R_{dark}$.

As used herein, the term "evaluation device" generally refers to an arbitrary device designed to determine and/or generating at least one voltage output signal at the voltage output. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the voltage signal, such as one or more AD-converters and/or one or more filters. Further, the evaluation device may comprise one or more data storage devices. Further, as outlined above, the evaluation device may comprise one or more interfaces, such as one or more wireless interfaces and/or one or more wire-bound interfaces. The evaluation device may particularly comprise at least one data processing device, in particular an electronic data processing device, which can be designed to determine at least one output voltage signal. The evaluation device can also be designed to completely or partly control the at least one illumination source and/or to control the at least one voltage source and/or to adjust the at least one reference resistor. The evaluation device may further comprise one or more additional components, such as one or more electronic hardware components and/or one or more software components, such as one or more measurement units and/or one or more evaluation units and/or one or more controlling units.

For determining of signal noise, the characterizing photoconductor may be covered with at least one opaque mask. The opaque mask may be identical to the opaque mask for determining of dark resistance. The bias voltage source may be configured for apply the DC bias voltage to the photoconductor covered with the opaque mask. The photoconductor readout circuit may be configured for determining the response voltage of the characterizing photoconductor generated in response to the DC bias voltage. The voltage response may be proportional to the signal noise.

For determining of signal response to a known intensity, the characterizing photoconductor may be covered with at least one wavelength dependent filter. Masking the characterizing photoconductor with the wavelength dependent filter may allow that a signal with a frequency of interest can pass. The bias voltage source may be configured for apply the DC bias voltage to the photoconductor covered with the wavelength dependent filter. The term "wavelength dependent filter", as used herein is a broad term and is to be given its ordinary and customary meaning to a person of ordinary skill in the art and is not to be limited to a special or customized meaning. The term specifically may refer, without limitation, to at least one optical element configured for allowing light of a certain wavelength or wavelength range to pass and for preventing light of other wavelengths to pass. The wavelength dependent filter may allow that light of a known wavelength and power density to illuminate the light-sensitive region of the photoconductor.

The device may comprise at least one narrow band illumination source configured for generating light having a pre-defined and/or pre-determined intensity P. The narrow band illumination source may illuminate the photoconductor being covered with the wavelength dependent filter with a known intensity. A source wavelength of the narrow band illumination source may be detectable by the characterizing photoconductor being covered with the wavelength dependent filter and may be outside the wavelengths used by the other photoconductors of the array. The other photoconductors may be configured for responding to light within it's useful spectral response. In order to have a photoconductor respond to light from a specific wavelength, the photoconductor may be covered with a spectral filter to ensure that the wavelength reaching each photoconductor is narrowband at a specific wavelength. For example, a wavelength dependent filter may be set on top of each photoconductor to ensure that the NIR is narrowband of the correct frequency. The wavelength dependent filter and the opaque mask for the characterizing photoconductor may be part of the same filter being used for the other photoconductor sensors. As used herein, the term "narrow band illumination source" refers to at least one illumination source configured for generating light in a narrow wavelength range, in particular light having a specific wavelength. As used herein, the term "source wavelength" refers to the wavelength of light generated by the narrow band illumination source. The photoconductor readout circuit may be configured for determining the response voltage of the characterizing photoconductor generated in response to the DC bias voltage, wherein the voltage response is proportional to the signal response to a known intensity. The photoconductor readout circuit may be configured for determining the response voltage S of the characterizing photoconductor being covered with the wavelength dependent filter generated in response to illumination of its light-sensitive region by the narrow band illumination source. When the characterizing photoconductor is setup to respond to the source wavelength and when the intensity P is known, the signal response, i.e. the response voltage S, can be determined using the photoconductor readout circuit in real-time alongside the other pixels of the photoconductor array.

The evaluation device may be configured for determining responsivity R from the signal response to a known intensity and/or detectivity D* from the signal response to a known intensity and from signal noise. The evaluation device may be configured for determining the responsivity R by $$R = \frac{S}{PA},$$

wherein S is the response voltage, P is an incident power density and A is a surface area of the light-sensitive region of the characterizing photoconductor. The evaluation device may be configured for determining the detectivity D* by $$D* = \frac{\frac{S}{N}\sqrt{f}}{P\sqrt{A}},$$

wherein N is signal noise, f is a frequency of illumination, P is an incident power density and A is a surface area of the light-sensitive region of the characterizing photoconductor.

The evaluation device may be configured for estimating responsivity of each photoconductor of the array considering the measured responsivity R of the characterizing photoconductor. The evaluation device may be configured for estimating detectivity of each photoconductor of the array considering the measured detectivity D* of the characterizing photoconductor. The term "estimating" as used herein is a broad term and is to be given its ordinary and customary meaning to a person of ordinary skill in the art and is not to be limited to a special or customized meaning. The term specifically may refer, without limitation, to determining responsivity and/or detectivity of each of the photoconductors of the array assume a predefined and/or predetermined relationship between responsivity and/or detectivity of the characterizing photoconductor and of the other photoconductors of the array. If the characteristics of the photoconductors of the array are sufficient similar, change in the measured dark resistance, responsivity and detectivity of the characterizing photoconductor can be used to estimate the change of these parameters in the rest of the array. By assuming a known response of the pixels to environmental factors, it may be possible to estimate the dark resistance, responsivity and detectivity of each pixel in the array and to avoid calibrations within a range of environmental changes. As outlined above, the array may be fabricated monolithically on the same substrate such that each photoconductor should behave proportionally approximately the same. This may allow estimating the responsivity and/or detectivity of every pixel. This may allow fewer calibrations and more accurate measurements.

The determined dark resistance and/or responsivity R and/or detectivity D* may be stored within a non-volatile memory, e.g. of the evaluation device. These values can then be use to determine an absolute or relative power density of the illumination source during the other photoconductor measurements.

The photoconductor readout circuit is configured for determining of the response voltage of the characterizing photoconductor during operation of the array of photoconductors. The term "determining during operation of the array of photoconductors" as used herein is a broad term and is to be given its ordinary and customary meaning to a person of ordinary skill in the art and is not to be limited to a special or customized meaning. The term specifically may refer, without limitation, to that the measurements of dark resistance and/or signal response to a known power density and noise can be obtained in real-time alongside the other photoconductor measurements.

The evaluation device may be configured for comparing one or more of the determined dark resistance, the determined responsivity R or the determined detectivity D* with at least one pre-defined and/or pre-determined value. The evaluation device may be configured for generating at least one indication if a comparison reveals a difference by more than a pre-defined and/or pre-determined tolerance value. In particular, the evaluation device may be configured for generating a feedback metric whether an initial calibration is estimated to be still valid. In case the evaluation device determines that the difference is greater than a pre-defined and/or pre-determined tolerance value, the initial calibration is considered as not to be valid. In this case, the evaluation device may initiate a new calibration considering the determined dark resistance and/or the determined responsivity R and/or the determined detectivity D*.

Additionally or alternatively, from measuring with separate photodetectors also other parameters such as temperature, humidity, radiation outside the spectral response of the photoconductor, e.g. heat radiation, radioactivity, radio waves, may be determined using separate detection devices, in particular close to the array of photoconductors. These detection devices may be used for calibration and/or correction purposes.

In a further aspect of the present invention, a method for determining at least one variable characterizing of at least one array of photoconductors is proposed. In the method the device according to the present invention is used. Thus, with respect to embodiments and definitions of the method reference is made to the description of the device above or as described in further detail below.

The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
i) providing the array of photoconductors, wherein each photoconductor is configured for exhibiting an electrical resistance dependent on an illumination of its light-sensitive region, wherein at least one photoconductor of the array is designed as characterizing photoconductor;
ii) applying at least one alternating bias voltage to the characterizing photoconductor or at least one direct current (DC) bias voltage to the characterizing photoconductor by using at least one bias voltage source;
iii) determining of a response voltage of the characterizing photoconductor generated in response to the bias voltage, wherein the voltage response is proportional to the variable characterizing the array of photoconductors, wherein the determination of the response voltage of the characterizing photoconductor is performed during operation of the array of photoconductors.

For example, the variable characterizing the array of photoconductors may be signal response to a known intensity. The characterizing photoconductor of the array may be covered with at least one wavelength dependent filter. In step ii) the direct current (DC) bias voltage may be applied to the characterizing photoconductor. The method may comprise illuminating the characterizing photoconductor by using at least one narrow band illumination source. The narrow band illumination source may be configured for generating light having a pre-defined and/or pre-determined intensity P. A source wavelength of the narrow band illumination source may be detectable by the characterizing photoconductor and is outside the wavelengths used by the other photoconductors of the array. In step iii) the response voltage of the characterizing photoconductor generated in response to illumination of its light-sensitive region by the narrow band illumination source may be determined. The voltage response may be proportional to the signal noise. The method may comprise determining responsivity.

For example, the variable characterizing the array of photoconductors may be signal noise N. The characterizing photoconductor may be covered with at least one opaque mask. In step ii) the direct current (DC) bias voltage may be applied to the characterizing photoconductor. In step iii) the signal noise N may be determined by determining the response voltage of the characterizing photoconductor generated in response to the DC bias voltage. The method may comprise determining detectivity.

For example, the variable characterizing the array of photoconductors may be dark resistance $R_{dark}$. The characterizing photoconductor may be covered with at least one opaque mask. In step ii) the at least one alternating bias voltage may be applied to the characterizing photoconductor. The response voltage of the characterizing photoconductor generated in response to the alternating bias voltage may be determined, wherein the response voltage is proportional to a dark resistance $R_{dark}$ of the characterizing photoconductor.

The method may comprise generating at least one indication if the comparison reveals a difference by more than a pre-defined and/or pre-determined tolerance value and otherwise repeating steps ii) to iii).

The method may comprise estimating responsivity of each photoconductor of the array considering the measured responsivity R of the characterizing photoconductor and/or for estimating detectivity of each photoconductor of the array considering the measured detectivity $D^*$ of the characterizing photoconductor. For example, in a monolithically manufactured array, the dark resistance may vary by about 15% and the signal and detectivity by about 30%. Any change in the measured value of the characterizing photoconductors may result in a proportional change to the other sensors in the array.

In a further aspect of the present invention, a use of a device according to the present invention is disclosed for a purpose of spectrometer applications; agrochemical quality control; pharmaceutical quality control; food quality control; atmospheric science and other industrial applications.

Summarizing, in the context of the present invention, the following embodiments are regarded as particularly preferred:

Embodiment 1: A device comprising:
at least one array of photoconductors, wherein each photoconductor is configured for exhibiting an electrical resistance dependent on an illumination of its light-sensitive region, wherein at least one photoconductor of the array is designed as characterizing photoconductor;
at least one bias voltage source, wherein the bias voltage source is configured for applying at least one alternating bias voltage to the characterizing photoconductor or at least one direct current (DC) bias voltage to the characterizing photoconductor;
at least one photoconductor readout circuit, wherein the photoconductor readout circuit is configured for determining of a response voltage of the characterizing photoconductor generated in response to the bias voltage, wherein the voltage response is proportional to a variable characterizing the array of photoconductors, wherein the photoconductor readout circuit is configured for determining of the response voltage of the characterizing photoconductor during operation of the array of photoconductors.

Embodiment 2: The device according to the preceding embodiment, wherein the variable characterizing the array of photoconductors is at least one variable selected from the group consisting of: dark resistance $R_{dark}$; signal noise; signal response to a known intensity.

Embodiment 3: The device according to the preceding embodiment, wherein the device comprises at least one evaluation device, wherein the evaluation device is configured for determining responsivity R from the signal response to a known intensity and/or detectivity $D^*$ from the signal response to a known intensity and from signal noise.

Embodiment 4: The device according to any one of the preceding embodiment, wherein the evaluation device is configured for determining the responsivity R by $$R = \frac{S}{PA},$$

wherein is the response voltage, P is an incident power density and A is a surface area of the light-sensitive region of the characterizing photoconductor.

Embodiment 5: The device according to the preceding embodiment, wherein the evaluation device is configured for estimating responsivity of each photoconductor of the array considering the measured responsivity R of the characterizing photoconductor.

Embodiment 6: The device according to any one of the three preceding embodiments, wherein the evaluation device is configured for determining the detectivity D* by $$D* = \frac{\frac{S}{N}\sqrt{f}}{P\sqrt{A}},$$

wherein N is signal noise, f is a frequency of illumination, P is an incident power density and A is a surface area of the light-sensitive region of the characterizing photoconductor.

Embodiment 7: The device according to the preceding embodiment, wherein the evaluation device is configured for estimating detectivity of each photoconductor of the array considering the measured detectivity D* of the characterizing photoconductor.

Embodiment 8: The device according to any one of the preceding embodiments, wherein the characterizing photoconductor is covered with at least one opaque mask, wherein the photoconductor readout circuit is configured for determining the response voltage of the characterizing photoconductor generated in response to the alternating bias voltage, wherein the voltage response is proportional to the dark resistance $R_{dark}$ of the characterizing photoconductor.

Embodiment 9: The device according to the preceding embodiment, wherein the photoconductor readout circuit comprises at least one voltage divider circuit, wherein the voltage divider circuit comprises at least one reference resistor $R_{ref}$ being arranged in series with the characterizing photoconductor, wherein the photoconductor readout circuit comprises at least one charge amplifier, wherein the photoconductor readout circuit comprises at least one capacitor $C_b$ arranged between an input of the charge amplifier and an output of the voltage divider circuit, wherein the dark resistance $R_{dark}$ is determinable by $$|R_{dark}| = \left|\frac{v_b \tau}{\Delta v_o C_F}\right|,$$

wherein $v_b$ is the amplitude of the alternating bias voltage, $\Delta v_o$ is the response voltage and $\tau$ is the integration time of the charge amplifier.

Embodiment 10: The device according to the pre-preceding embodiment, wherein the photoconductor readout circuit comprises at least one current skimming circuit.

Embodiment 11: The device according to any one of preceding embodiments, wherein the characterizing photoconductor is covered with at least one opaque mask, wherein the photoconductor readout circuit is configured for determining the response voltage of the characterizing photoconductor generated in response to the DC bias voltage, wherein the voltage response is proportional to the signal noise.

Embodiment 12: The device according to any one of the preceding embodiments, wherein the characterizing photoconductor is covered with at least one wavelength dependent filter, wherein the photoconductor readout circuit is configured for determining the response voltage of the characterizing photoconductor generated in response to the DC bias voltage, wherein the voltage response is proportional to the signal response to a known intensity.

Embodiment 13: The device according to the preceding embodiment, wherein the device comprises at least one narrow band illumination source configured for generating light having a pre-defined and/or pre-determined intensity P, wherein a source wavelength of the narrow band illumination source is detectable by the characterizing photoconductor being covered with the wavelength dependent filter and is outside the wavelengths used by the other photoconductors of the array, wherein the photoconductor readout circuit is configured for determining the response voltage S of the characterizing photoconductor being covered with the wavelength dependent filter generated in response to illumination of its light-sensitive region by the narrow band illumination source.

Embodiment 14: The device according to any one of the preceding embodiments, wherein each photoconductor responds to electromagnetic energy of a different wavelength.

Embodiment 15: A method for determining at least one variable characterizing of at least one array of photoconductors, wherein the method uses a device according to any one of the preceding embodiments and the method comprises the following steps:
  i) providing the array of photoconductors, wherein each photoconductor is configured for exhibiting an electrical resistance dependent on an illumination of its light-sensitive region, wherein at least one photoconductor of the array is designed as characterizing photoconductor;
  ii) applying at least one alternating bias voltage to the characterizing photoconductor or at least one direct current (DC) bias voltage to the characterizing photoconductor by using at least one bias voltage source;
  iii) determining of a response voltage of the characterizing photoconductor generated in response to the bias voltage, wherein the voltage response is proportional to the variable characterizing the array of photoconductors, wherein the determination of the response voltage of the characterizing photoconductor is performed during operation of the array of photoconductors.

Embodiment 15: The method according to the preceding embodiment, wherein the variable characterizing the array of photoconductors is signal response to a known intensity, wherein the characterizing photoconductor of the array is covered with at least one wavelength dependent filter, wherein in step ii) the direct current (DC) bias voltage is applied to the characterizing photoconductor, wherein the method comprises illuminating the characterizing photoconductor by using at least one narrow band illumination source, wherein the narrow band illumination source is configured for generating light having a pre-defined and/or pre-determined intensity P, wherein a source wavelength of the narrow band illumination source is detectable by the characterizing photoconductor and is outside the wavelengths used by the other photoconductors of the array, wherein in step iii) the response voltage of the characterizing photoconductor generated in response to illumination of its light-sensitive region by the narrow band illumination source is determined, wherein the voltage response is proportional to the signal response to a known intensity.

Embodiment 16: The method according to any one of the preceding claims referring to a method for determining at least one variable characterizing of at least one array of photoconductors, wherein the variable characterizing the array of photoconductors is signal noise N, wherein the characterizing photoconductor is covered with at least one opaque mask, wherein in step ii) the direct current (DC) bias voltage is applied to the characterizing photoconductor, wherein in step iii) the signal noise N is determined by determining the response voltage of the characterizing photoconductor generated in response to the DC bias voltage.

Embodiment 17: The method according to any one of the preceding claims referring to a method for determining at least one variable characterizing of at least one array of photoconductors, wherein the variable characterizing the array of photoconductors is dark resistance $R_{dark}$, wherein the characterizing photoconductor is covered with at least one opaque mask, wherein in step ii) the at least one alternating bias voltage is applied to the characterizing photoconductor, wherein the response voltage of the characterizing photoconductor generated in response to the alternating bias voltage is determined, wherein the response voltage is proportional to a dark resistance $R_{dark}$ of the characterizing photoconductor.

Embodiment 18: The method according to any one of the preceding claims referring to a method for determining at least one variable characterizing of at least one array of photoconductors, wherein the method comprises generating at least one indication if the comparison reveals a difference by more than a pre-defined and/or pre-determined tolerance value and otherwise repeating steps ii) to iii).

Embodiment 19: Use of a device according to any one of the preceding embodiments referring to a device, for one or more of spectrometer applications; agrochemical quality control; pharmaceutical quality control; food quality control; atmospheric science and other industrial applications.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
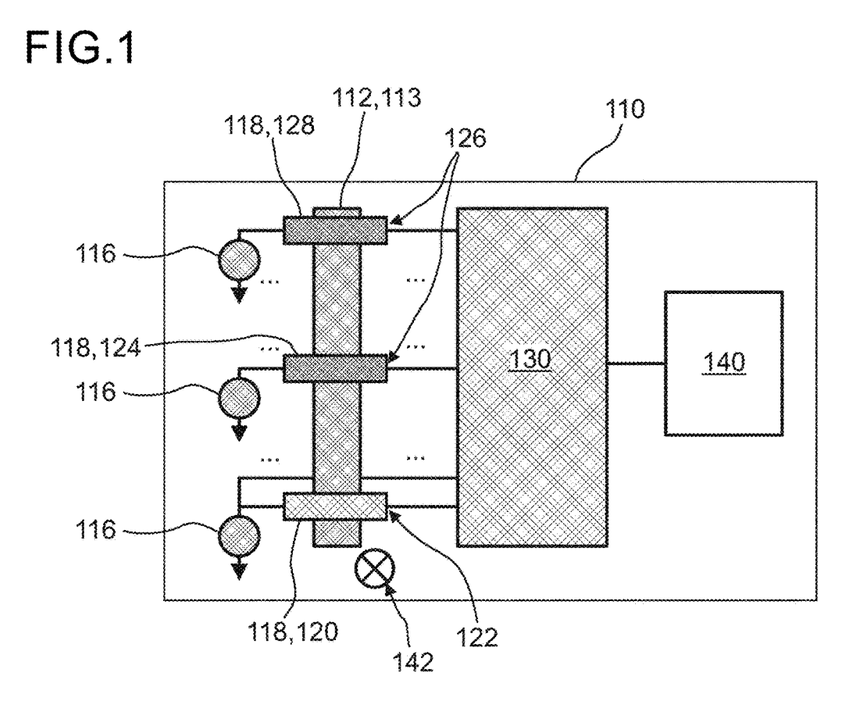
FIG. 1 shows an exemplary embodiment of a device according to the present invention.

FIG. 1 illustrates, in a highly schematic fashion, an exemplary embodiment of a device 110. The device 110 comprises at least one array 113 of photoconductors 112 configured for exhibiting an electrical resistance dependent on an illumination of its light-sensitive region of the photoconductor 112. The array 113 may comprise a plurality of photoconductors 112 arranged in a matrix having a plurality of pixels. The matrix specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The photoconductors 112 of the matrix specifically may be equal in one or more of size, sensitivity and other optical, electrical and mechanical properties. The light-sensitive regions of all o photoconductors 112 of the matrix specifically may be located in a common plane, such that a light beam illuminating the array may generate a light spot on the common plane. The array 113 may be fabricated monolithically on the same substrate. The photoconductors 112 of the array 113 may be designed identical, in particular with respect to size and/or shape of their light-sensitive regions and/or photoconductive materials. In the following exemplary one photoconductor 112 is described.

Each of the photoconductors 112 may be light sensitive element capable of exhibiting a specific electrical resistance dependent on an illumination of the light-sensitive region the photoconductor 112. Specifically, the electrical resistance is dependent on the illumination of a material of the photoconductor 112. The photoconductor 112 may comprise a light-sensitive region comprising a photoconductive material. The light-sensitive region may comprise at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, e.g. doped Ge, Si, GaAs. However, other materials may be feasible. Further possible photoconductive materials are described in WO 2016/120392 A1, for example. For example, the photoconductor 112 may be a photoconductor commercially available under the brand name Hertzstueck™ from trinamiX GmbH, D-67056 Ludwigshafen am Rhein, Germany. A photoconductor 112 can, for example, be applied in light-sensitive detector circuits.

Figure 2:
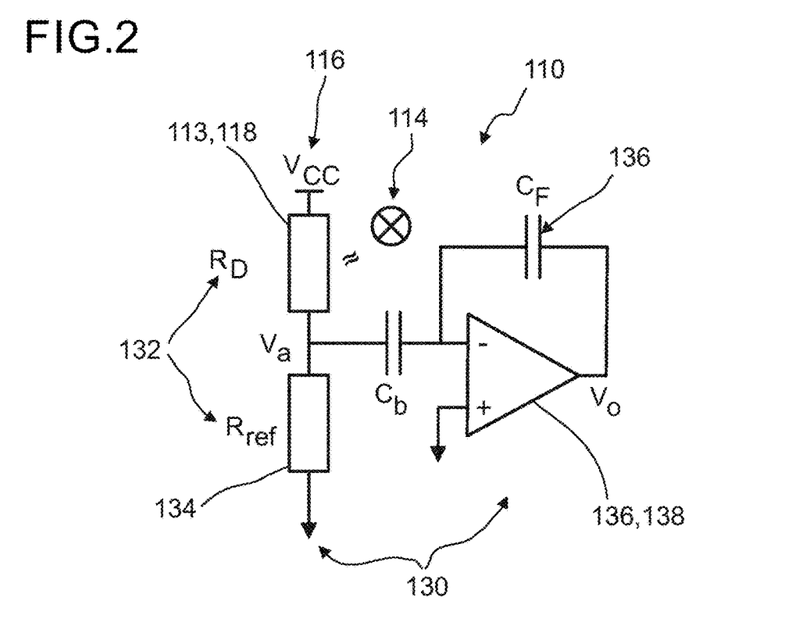
FIG. 2 shows a further exemplary embodiment of the device.

For example, the light-sensitive region may be illuminated by at least one illumination source 114, see for example FIG. 2. The illumination source 114 can for example be or comprise an ambient light source and/or may be or may comprise an artificial illumination source. By way of example, the illumination source 114 may comprise at least one infrared emitter and/or at least one emitter for visible light and/or at least one emitter for ultraviolet light. By way of example, the illumination source 114 may comprise at least one light emitting diode and/or at least one laser diode. The illumination source 114 can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. The illumination source 114 generally may be adapted to emit light in at least one of: the ultraviolet spectral range, the infrared spectral range. Most preferably, at least one illumination source is adapted to emit light in the NIR and IR range, preferably in the range of 800 nm and 5000 nm, most preferably in the range of 1000 nm and 4000 nm.

The illumination source 114 may comprise at least one non-continuous light source. Alternatively, the illumination source 114 may comprise at least one continuous light source. The light source may be an arbitrary light source having at least one radiating wavelength having an overlap to the sensitive wavelength of the photoconductor 112. For example, the light source may be configured for generating a Planckian radiation. For example, the light source may comprise at least one light emitting diode (LED) and/or at least one Laser source. For example, the light source may be configured for generating illumination by an exotherm reaction, like an oxidation of liquid or solid-material or Gas. For example, the light source may be configured for generating illumination out of fluorescent effects. The illumination source 114 may be configured for generating at least one modulated light beam. Alternatively, the light beam generated by the illumination source may be non-modulated and/or may be modulated by further optical means. The illumination source 114 may comprise at least one optical chopper device configured for modulating a light beam from the continuous light source. The optical chopper device may be configured for periodically interrupting the light beam from the continuous light source. For example, the optical chopper device may be or may comprise at least one variable frequency rotating disc chopper and/or at least one fixed frequency tuning fork chopper and/or at least one optical shutter. Due to the non-continuous illumination the output current may be a changing current signal, also denoted modulation current. The modulated current may be small comparted to dark current of the photoconductor 112.

For example, the light-sensitive region may be a two-dimensional or three-dimensional region which preferably, but not necessarily, is continuous and can form a continuous region. The photoconductor 112 can have one or else a plurality of such light-sensitive regions. In response to the illumination, the electrical resistance of the photoconductor 112 is adjusted and/or changed and/or varied. When the photoconductor 112 is illuminated the photoconductor 112 may exhibit a decrease in electrical resistance. The photoconductor 112 may lower its resistivity when illuminated. Specifically, the electrical resistance of the photoconductor 112 may decrease with increasing incident light intensity. The change between dark resistance and bright resistance is the quantity to be measured or to be read out.

The photoconductors 112 of the array 113 each may respond to electromagnetic energy of a different wavelength. In particular, the photoconductors 112 may detect electromagnetic absorption at different wavelengths in the electromagnetic spectrum. The array 113 of photoconductors 112 may be designed such that each pixel in the array responds to electromagnetic energy of a different wavelength. This may allow using the array 113 for spectrometer applications.

The device 110 comprises at least one bias voltage source 116 configured for applying at least one bias voltage to the photoconductor. In FIG. 1 bias voltage source 116 for three photoconductors 112 is exemplary shown. The photoconductors 112 of the array 113 may be electrically connected with the bias voltage source 116. The bias voltage may be the voltage applied across the photoconductor material.

At least one photoconductor 112 of the array 113 may be designed as characterizing photoconductor 118. In FIG. 2, the device 110 comprises three characterizing photoconductors 118. At least one first characterizing photoconductor 120 of the array 113 is covered with at least one wavelength dependent filter 122. Masking the characterizing photoconductor 118 with the wavelength dependent filter 122 may allow that a signal with a frequency of interest can pass. The wavelength dependent filter 122 may allow that light of a known wavelength and power density to illuminate the light-sensitive region of the photoconductor 120. At least one second characterizing photoconductor 124 of the array 113 is covered with at least one opaque mask 126. At least one third characterizing photoconductor 128 is covered with the at least one opaque mask 126. The opaque mask 126 may be configured for preventing that light can pass to the light-sensitive region of the covered photoconductor 124, 128. The characterizing photoconductor 118 may be sensitive to a narrow wavelength range, in particular to a single wavelength. The opaque mask 126 may be configured as filter element configured for preventing that light of said wavelength can pass to the characterizing photoconductor. Usage of the opaque mask 126 may allow measurement of dark resistance.

The device 110 comprises at least one photoconductor readout circuit 130. The photoconductor readout circuit 130 is configured for determining of a response voltage of the characterizing photoconductor 118 generated in response to the bias voltage. The voltage response is proportional to a variable characterizing the array 113 of photoconductors 112. The behavior of the array 113 of photoconductors 112 may depend on dark resistance and/or responsivity R and/or detectivity D*. The variable characterizing the array 113 of photoconductors 112 may be at least one variable selected from the group consisting of: dark resistance $R_{dark}$; signal noise N; signal response S to a known intensity. The responsivity of the photoconductor 112 may be a measurement of a DC resistance of the photoconductor 112. It is a function of the DC bias voltage applied to the photoconductor 112 and a DC current flowing through it. The responsivity of the photoconductor 112 may be a measure of output voltage per unit Watt of the incident electromagnetic energy. The detectivity D* of the photoconductor 112 may be a measure of signal to noise ratio of the photoconductor 112 normalized to the frequency f of interest, incoming power density of the illumination source and the light-sensitive region of the photoconductor. Monolithically integrated high-density arrays of 113 photoconductors 112 may be produced on a single insulated substrate. The dark resistance, resistivity and detectivity may be similar between the individual photoconductors 112 and change with approximately the same proportional relative the each other when environmental conditions change.

For determining of the dark resistance, the bias voltage source 116 is configured for applying at least one alternating bias voltage $U_{bias,AC}$ to the third characterizing photoconductor 128. The bias voltage source 116 may be configured for changing the bias voltage. Specifically, the bias voltage is selected such that an integral of charge carriers, such as the total current which flows through the photoconductor over a measurement period is zero. The measurement period may be the time between two consecutive transitions of the bias voltage polarization in the same direction, such as from rising edge, e.g. a positive edge, to rising edge or from falling edge, e.g. negative edge, to falling edge. The bias voltage can be from ±0.001 V to ±5000 V. Preferably, the bias voltage may be from ±0.1 V to ±500 V and most preferably the bias voltage may be from ±1 V to ±50 V. The bias voltage may be switching between positive and negative. An electrical field across the photoconductive material due to the applied bias voltage may be about 50 V/mm.

For determining of the dark resistance, the photoconductor readout circuit 130 may be designed as shown in FIG. 2. The photoconductor readout circuit 130 may comprise at least one voltage divider circuit 132. The voltage divider circuit 132 may comprise at least one reference resistor $R_{ref}$ 134 being arranged in series with the third characterizing photoconductor 128. The reference resistor 134 may have a known electrical resistance $R_{ref}$. The reference resistor 134 may be an arbitrary resistor adapted to allow determining voltage changes. The photoconductor readout circuit 130 may comprise at least one charge amplifier 136. The charge amplifier 136 may be configured as integrator with high input impedances. The charge amplifier 136 may be configured to convert charge into voltage. The high input impedances may prevent leakage loss. The charge amplifier 136 may comprise an operational amplifier 138. The charge amplifier 138 may comprise at least one capacitor $C_F$ in a feedback path. The capacitor $C_F$ in the feedback path may be configured for accumulating current over time. The photoconductor readout circuit 130 comprises at least one capacitor, denoted as capacitor $C_b$ in the following. The capacitor may have a capacity from 100 pF to 500 nF. The capacitor $C_b$ may be arranged between the input of the charge amplifier 136 and an output of the voltage divider circuit 132. If the capacitor $C_b$ is sufficiently large, the dark resistance can be determined by $$|R_{dark}| = \left|\frac{v_b \tau}{\Delta v_o C_F}\right|,$$

wherein $v_b$ is the amplitude of the alternating bias voltage, $\Delta v_o$ is the response voltage and $\tau$ is the integration time of the charge amplifier 136. Other readout electronics or small capacitors $C_b$ that rely on the alternating bias voltage may have different relationships between the dark resistance and the response voltage but a closed linear solution will exist in these cases as well.

Alternatively, for determining of the dark resistance the photoconductor readout circuit 130 may be designed as at least one current skimming circuit. Other architectures may be possible, too. For example, the dark resistance can be determined by measuring the current directly and by calculating the resistance through ohm's law.

The device 110 may comprise at least one evaluation device 140. The evaluation device 140 may be configured for determining dark resistance of each photoconductor 112 of the array 113 considering the dark resistance $R_{dark}$.

For determining of signal noise, the second characterizing photoconductor 124 may be covered with the at least one opaque mask 126. The opaque mask 126 may be identical to the opaque mask for determining of dark resistance. The bias voltage source 116 may be configured for apply the DC bias voltage to the second characterizing photoconductor 124 covered with the opaque mask. The photoconductor readout circuit 130 may be configured for determining the response voltage of the characterizing photoconductor generated in response to the DC bias voltage. The voltage response may be proportional to the signal noise.

For determining of signal response to a known intensity, the first characterizing photoconductor 120 may be covered with the at least one wavelength dependent filter 122. The device 110 may comprise at least one narrow band illumination source 142 configured for generating light having a pre-defined and/or pre-determined intensity P. The narrow band illumination source 142 may illuminate the first characterizing photoconductor 120 being covered with the wavelength dependent filter 122 with a known intensity. A source wavelength of the narrow band illumination source 142 may be detectable by the first characterizing photoconductor 120 and may be outside the wavelengths used by the other photoconductors 112 of the array 113. The other photoconductors 112 may be configured for responding to light within it's useful spectral response. In order to have a photoconductor respond to light from a specific wavelength, the photoconductor may be covered with a spectral filter to ensure that the wavelength reaching each photoconductor is narrowband at a specific wavelength. For example, a wavelength dependent filter may be set on top of each photoconductor to ensure that the NIR is narrowband of the correct frequency. The wavelength dependent filter 122 and the opaque mask 126 for the characterizing photoconductor 118 may be part of the same filter being used for the other photoconductors 120. The photoconductor readout circuit 130 may be configured for determining the response voltage of the first characterizing photoconductor 120 generated in response to the DC bias voltage, wherein the voltage response is proportional to the signal response to a known intensity. The photoconductor readout circuit 130 may be configured for determining the response voltage S of the first characterizing photoconductor 120 generated in response to illumination of its light-sensitive region by the narrow band illumination source 142. When the first characterizing photoconductor 120 is setup to respond to the source wavelength and when the intensity P is known, the signal response, i.e. the response voltage S, can be determined using the photoconductor readout circuit 130 in real-time alongside the other pixels of the photoconductor array 113.

The evaluation device 140 may be configured for determining responsivity R from the signal response to a known intensity and/or detectivity D* from the signal response to a known intensity and from signal noise. The evaluation device 140 may be configured for determining the responsivity R by $$R = \frac{S}{PA},$$

wherein S is the response voltage, P is an incident power density and A is a surface area of the light-sensitive region of the first characterizing photoconductor 120. The evaluation device 140 may be configured for determining the detectivity D* by $$D* = \frac{\frac{S}{N}\sqrt{f}}{P\sqrt{A}},$$

wherein N is signal noise, f is a frequency of illumination, P is an incident power density and A is a surface area of the light-sensitive region of the first characterizing photoconductor 120.

The evaluation device 140 may be configured for estimating responsivity of each photoconductor 112 of the array 113 considering the measured responsivity R of the characterizing photoconductor 118. The evaluation device 140 may be configured for estimating detectivity of each photoconductor of the array considering the measured detectivity D* of the characterizing photoconductor 118. If the characteristics of the photoconductors 112 of the array 113 are sufficient similar, change in the measured dark resistance, responsivity and detectivity of the characterizing photoconductor 118 can be used to estimate the change of these parameters in the rest of the array. By assuming a known response of the pixels to environmental factors, it may be possible to estimate the dark resistance, responsivity and detectivity of each pixel in the array and to avoid calibrations within a range of environmental changes. The array 113 may be fabricated monolithically on the same substrate such that each photoconductor 112 should behave proportionally approximately the same. This may allow estimating the responsivity and/or detectivity of every pixel. This may allow fewer calibrations and more accurate measurements.

The determined dark resistance and/or responsivity R and/or detectivity D* may be stored within a non-volatile memory, e.g. of the evaluation device 140. These values can then be use to determine an absolute or relative power density of the illumination source 114 during the other photoconductor measurements.

The photoconductor readout circuit 130 is configured for determining of the response voltage of the characterizing photoconductors 118 during operation of the array 113 of photoconductors 112. In particular, the measurements of dark resistance and/or signal response to a known power density and noise can be obtained in real-time alongside the other photoconductor measurements.

The evaluation device 140 may be configured for comparing one or more of the determined dark resistance, the determined responsivity R or the determined detectivity D* with at least one pre-defined and/or pre-determined value. The evaluation device 140 may be configured for generating at least one indication if the comparison reveals a difference by more than a pre-defined and/or pre-determined tolerance value. In particular, the evaluation device 140 may be configured for generating a feedback metric whether an initial calibration is estimated to be still valid. In case the evaluation device 140 determines that the difference is greater than a pre-defined and/or pre-determined tolerance value, the initial calibration is considered as not to be valid. In this case, the evaluation device 140 may initiate a new calibration considering the determined dark resistance and/or the determined responsivity R and/or the determined detectivity D*.

LIST OF REFERENCE NUMBERS

- 110 detector
- 112 photoconductor
- 113 array
- 114 illumination source
- 116 bias voltage source
- 118 characterizing photoconductor
- 120 first characterizing photoconductor
- 122 wavelength dependent filter
- 124 second characterizing photoconductor
- 126 opaque mask
- 128 third characterizing photoconductor
- 130 photoconductor readout circuit
- 132 voltage divider circuit
- 134 reference resistor
- 136 charge amplifier
- 138 operational amplifier
- 140 evaluation device
- 142 narrow band illumination source

The invention claimed is:

1. A device comprising:
   at least one array of photoconductors, wherein each photoconductor is configured for exhibiting an electrical resistance dependent on an illumination of a light-sensitive region of each photoconductor, wherein at least one photoconductor of the at least one array of photoconductors is designed as a characterizing photoconductor;
   at least one bias voltage source, wherein the bias voltage source is configured for applying at least one alternating bias voltage to the characterizing photoconductor or at least one direct current (DC) bias voltage to the characterizing photoconductor;
   at least one photoconductor readout circuit, wherein the photoconductor readout circuit is configured for determining of a response voltage of the characterizing photoconductor generated in response to the bias voltage, wherein the response voltage is proportional to a variable characterizing the at least one array of photoconductors, wherein the variable characterizing the at least one array of photoconductors is at least one variable selected from a group consisting of dark resistance $R_{dark}$, signal noise, and signal response to a known intensity, wherein the photoconductor readout circuit is configured for determining of the response voltage of the characterizing photoconductor during operation of the at least one array of photoconductors; and
   at least one evaluation device, wherein the evaluation device is configured for determining responsivity R from the signal response to the known intensity and detectivity D* from the signal response to the known intensity and from signal noise.

2. The device according to claim 1, wherein the evaluation device is configured for estimating responsivity of each photoconductor of the at least one array of photoconductors considering the measured responsivity R of the characterizing photoconductor and/or wherein the evaluation device is configured for estimating detectivity of each photoconductor of the at least one array of photoconductors considering the measured detectivity D* of the characterizing photoconductor.

3. The device according to claim 1, wherein the characterizing photoconductor is covered with at least one opaque mask, wherein the photoconductor readout circuit is configured for determining the response voltage of the characterizing photoconductor generated in response to the alternating bias voltage, wherein the response voltage is proportional to the dark resistance $R_{dark}$ of the characterizing photoconductor.

4. The device according to claim 1, wherein the characterizing photoconductor is covered with at least one opaque mask, wherein the photoconductor readout circuit is configured for determining the response voltage of the characterizing photoconductor generated in response to the DC bias voltage, wherein the response voltage is proportional to the signal noise.

5. The device according to claim 1, wherein the characterizing photoconductor is covered with at least one wavelength dependent filter, wherein the photoconductor readout circuit is configured for determining the response voltage of the characterizing photoconductor generated in response to the DC bias voltage, wherein the response voltage is proportional to the signal response to the known intensity.

6. The device according to claim 5, wherein the device comprises at least one narrow band illumination source configured for generating light having a pre-defined and/or pre-determined intensity P, wherein a source wavelength of the narrow band illumination source is detectable by the characterizing photoconductor being covered with the wavelength dependent filter and is outside the wavelengths used by the other photoconductors of the array, wherein the photoconductor readout circuit is configured for determining the response voltage S of the characterizing photoconductor being covered with the wavelength dependent filter generated in response to illumination of its light-sensitive region by the narrow band illumination source.

7. The device according to claim 1, wherein each photoconductor responds to electromagnetic energy of a different wavelength.

8. The device according to claim 1, wherein the device is a spectrometer device; an agrochemical quality control device; a pharmaceutical quality control device; a food quality control device; or an atmospheric science device.

9. A method for determining at least one variable characterizing at least one array of photoconductors, the method comprising:
i) providing at least one array of photoconductors, wherein each photoconductor is configured for exhibiting an electrical resistance dependent on an illumination of a light-sensitive region of each photoconductor, wherein at least one photoconductor of the at least one array of photoconductors is designed as a characterizing photoconductor;
ii) applying at least one alternating bias voltage to the characterizing photoconductor or at least one direct current (DC) bias voltage to the characterizing photoconductor by using at least one bias voltage source;
iii) determining a response voltage of the characterizing photoconductor generated in response to the bias voltage, wherein the response voltage is proportional to the variable characterizing the at least one array of photoconductors, wherein the variable characterizing the at least one array of photoconductors is at least one variable selected from a group consisting of dark resistance $R_{dark}$, signal noise, and signal response to a known intensity, wherein determining the response voltage of the characterizing photoconductor is performed during operation of the at least one array of photoconductors; and
iv determining responsivity R from the signal response to the known intensity and detectivity D* from the signal response to the known intensity and from signal noise with at least one evaluation device.

10. The method according to claim 9, wherein the variable characterizing the at least one array of photoconductors is a signal response to a known intensity, wherein the characterizing photoconductor of the at least one array of photoconductors is covered with at least one wavelength dependent filter, wherein in step ii) the direct current (DC) bias voltage is applied to the characterizing photoconductor, wherein the method further comprises illuminating the characterizing photoconductor by using at least one narrow band illumination source, wherein the narrow band illumination source is configured for generating light having a pre-defined and/or pre-determined intensity P, wherein a source wavelength of the narrow band illumination source is detectable by the characterizing photoconductor and is outside the wavelengths used by the other photoconductors of the array, wherein in step iii) the response voltage of the characterizing photoconductor generated in response to illumination of the light-sensitive region of the characterizing photoconductors by the narrow band illumination source is determined, wherein the response voltage is proportional to the signal response to the known intensity.

11. The method according to claim 9, wherein the variable characterizing the array of photoconductors is signal noise N, wherein the characterizing photoconductor is covered with at least one opaque mask, wherein in step ii) the direct current (DC) bias voltage is applied to the characterizing photoconductor, wherein in step iii) the signal noise N is determined by determining the response voltage of the characterizing photoconductor generated in response to the DC bias voltage.

12. The method according to claim 9, wherein the variable characterizing the array of photoconductors is dark resistance $R_{dark}$, wherein the characterizing photoconductor is covered with at least one opaque mask, wherein in step ii) the at least one alternating bias voltage is applied to the characterizing photoconductor, wherein the response voltage of the characterizing photoconductor generated in response to the alternating bias voltage is determined, wherein the response voltage is proportional to a dark resistance $R_{dark}$ of the characterizing photoconductor.

13. The method according to claim 9, wherein the method comprises generating at least one indication if a comparison of one or more of a determined dark resistance, a determined responsivity, or a determined detectivity D* reveals a difference by more than a pre-defined and/or pre-determined tolerance value and otherwise repeating steps ii) to iii).

* * * * *